J. R. BASIGER.
TERRET PAD.

No. 177,675.   Patented May 23, 1876.

WITNESSES:

INVENTOR:
John R. Basiger
BY
ATTORNEYS.

UNITED STATES PATENT OFFICE.

JOHN R. BASIGER, OF HARRISONVILLE, MISSOURI.

IMPROVEMENT IN TERRET-PADS.

Specification forming part of Letters Patent No. 177,675, dated May 23, 1876; application filed April 24, 1876.

*To all whom it may concern:*

Figure 1:
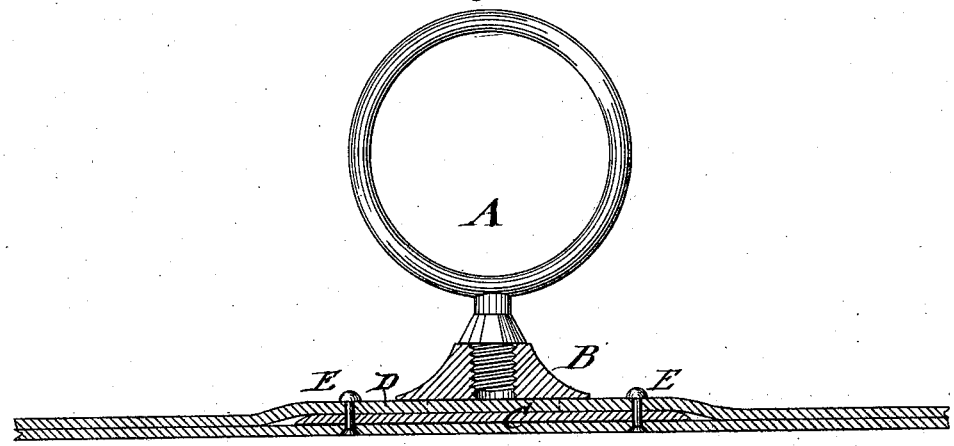
Figure 2:
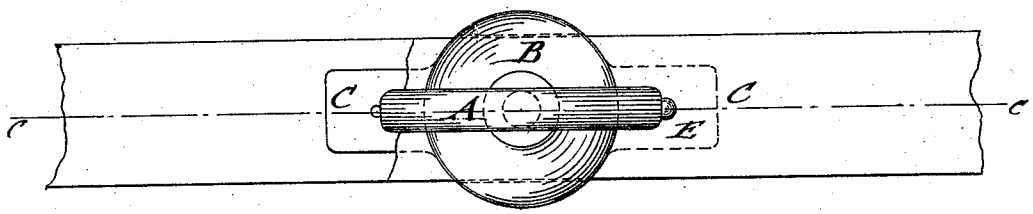
Figure 3:
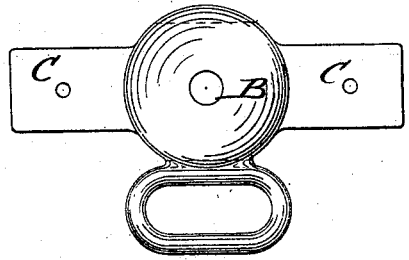
Figure 4:
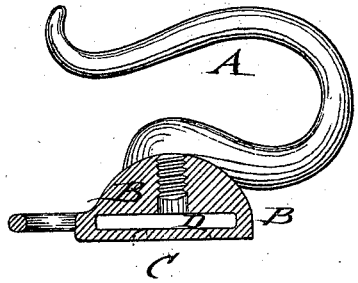

Be it known that I, JOHN RUDOLPH BASIGER, of Harrisonville, county of Cass and State of Missouri, have invented a new and Improved Terret-Pad, of which the following is a specification:

In the accompanying drawing, Figure 1 represents a vertical longitudinal section of my improved terret-pad on line $c\,c$, Fig. 2. Fig. 2 is a top view; and Figs. 3 and 4 are top views and sections of the pad with check-hook.

Similar letters of reference indicate the same parts.

The object of my invention is to provide an improved terret and check-hook pad for harness for horses or mules exposed to heavy work and strain; and the invention consists of a socket with a loop and extension base-plate, that is riveted to the back-band and to a layer of the same, passing through the loop.

In the drawing, A represents a harness-terret or check-hook, which is screwed into a socket, B, that is made with a base-plate, C, and a loop or recess, D, between the base-plate and lower part of socket, for the passage of the return-layer of the backband.

The terret or check-hook A is made above the screw-shank with a polygonal or other shaped part, that may be readily taken hold of for unscrewing the shank from the socket when the terret ring or hook is broken off by the rolling of the animal, or by any other cause. The terret may thus be readily replaced in a cheap manner, while the socket and base-plate, on account of their substantial attachment to the backband, are not disposed to be broken or injured.

The layer of the backband that runs through the loop or recess is fastened by the rivets E to the extensions of the base-plate, and then sewed to the backband on each side, as the base-plate will permit. The ends of the base-plate are slightly beveled for this purpose.

The pad is of simple construction, easily attached, and durable, forming a support for the terret or hook, that is not liable to breakage by any action of the animal.

Having thus described my invention, what I claim as new, and desire to secure by Letters Patent, is—

The improved terret or hook pad for harness, made of a screw-socket for a terret-ring, with loop or recess for retaining the layer of the backband, and of a base-plate, with extension-lugs, for being riveted or screwed to the backband, substantially in the manner and form herein specified.

JOHN RUDOLPH BASIGER.

Witnesses:
  GEO. DIPLEY,
  JOHN N. DENHAM.